United States Patent [19]

Kluger

[11] Patent Number: 4,472,964

[45] Date of Patent: Sep. 25, 1984

[54] APPARATUS FOR INDICATING THE NEED FOR MAINTENANCE WORK ON AN INTERNAL COMBUSTION ENGINE

[75] Inventor: Götz-Uwe Kluger, Kronberg, Fed. Rep. of Germany

[73] Assignee: VDO Adolf Schindling AG, Frankfurt, Fed. Rep. of Germany

[21] Appl. No.: 395,949

[22] Filed: Jul. 7, 1982

[30] Foreign Application Priority Data

Jul. 22, 1981 [DE] Fed. Rep. of Germany ....... 3128971

[51] Int. Cl.$^3$ .......... G01M 15/00

[52] U.S. Cl. .......... 73/116; 73/119 A

[58] Field of Search .......... 368/8, 5; 73/116, 117.3, 73/119 A, 113, 114

[56] References Cited

U.S. PATENT DOCUMENTS

| | | | |
|---|---|---|---|
| 2,533,638 | 12/1950 | Norris | 368/8 |
| 3,758,756 | 9/1973 | Johns | 368/8 X |
| 3,903,736 | 9/1975 | Bissett et al. | 73/117.3 |
| 3,965,669 | 6/1976 | Larson et al. | 368/5 X |
| 4,012,948 | 3/1977 | Kuno et al. | 73/119 A X |
| 4,253,330 | 3/1981 | Kato | 73/113 |
| 4,317,106 | 2/1982 | Huber | 368/6 X |

*Primary Examiner*—Jerry W. Myracle
*Attorney, Agent, or Firm*—Martin A. Farber

[57] ABSTRACT

A device for indicating the need for maintenance work on an automobile engine is equipped, in the manner of an electric clock, with a frequency reducer (2), an amplifier (3), a stepping motor (4) and a clock movement (5). The frequency reducer (2), however, does not receive its pulses from a quartz oscillator, as in the case of a quartz clock, but from a pulse generator (6) of a revolution indicator (7). The pulse generator (6) can, of course, also be a separate component which is intended exclusively for the device.

11 Claims, 2 Drawing Figures

APPARATUS FOR INDICATING THE NEED FOR MAINTENANCE WORK ON AN INTERNAL COMBUSTION ENGINE

The present invention relates to a device for indicating the need for maintenance work on an internal combustion engine as a function of the condition of the internal combustion engine, intended in particular for automotive vehicles.

Maintenance work must be carried out from time to time on internal combustion engines. It is customary in the case of automobiles to effect an oil change every 7500 km and an inspection every 15,000 km. Aside from the fact that the need for maintenance work can easily be overlooked, the change of oil and the inspection at fixed kilometer intervals do not take into account the actual condition of the internal combustion engine. It is known, for instance, that motor oil is subject to faster decline in quality upon high-speed travel, due to the high oil temperatures which then occur, than when traveling at moderate speed. City travel over short distances results in rapid reduction in the quality of the oil.

In order to be able better to take into account the condition of the engine when establishing the maintenance intervals, a so-called service-interval indicator has already been developed for automotive vehicles. It consists of a computer which processes pulses which come from an electronic tachometer, of the ignition system of the engine and of a clock. Such a service-interval indicator is relatively complicated and is therefore expensive to manufacture so that it can be used only in vehicles of higher price.

The object of the present invention is to develop a device of the aforementioned type which is simple in construction and therefore inexpensive to manufacture so that it can find widespread use.

This object is achieved, in accordance with the invention, by an electronic clock mechanism (1), whose time-determining component is replaced by an electric pulse generator (6) which gives off, per unit of time, a number of pulses which is dependent on the operation of the internal combustion engine.

Other advantageous embodiments of the invention arise further, in that the pulse generator (6) operates in dependence on the fuel consumption, the speed of travel, or the pulses of an injection system. The latter is advisable, for instance, in automotive vehicles having a diesel engine since such vehicles generally do not have a revolution indicator. The dependence of the pulse generator of the device of the invention refers, in the case of automotive vehicles, primarily to the structural characteristics of the automotive vehicle.

Another advantgeous embodiment of the invention is based on the fact that the clock mechanism (1) corresponds to the mechanism of an ordinary clock without second or minute hand, and is provided with a kilometer graduation (10) rather than with a time graduation. By the extensive use of a clock mechanism (1) for the device of the invention, the device becomes particularly inexpensive since only two parts of an ordinary clock need be replaced by other components.

Also advantageous is an embodiment of the invention in which the clock mechanism (1) has a setting device (9), customary in clocks, for setting the hand (8) via the cannon pinion and a scale (10) graduated in kilometers which increases in counterclockwise direction. The hand of the device of the invention can, for instance, after the changing of the oil, be set to a kilometer reading at which the oil should be again changed. Since the hand approaches its zero position upon increased use of the automotive vehicle, it is indicated particularly clearly how many kilometers still remain until the oil need be changed, this distance being determined, for instance, on basis of the average speed of rotation upon travel. If one travels at a particularly high speed then the hand reaches the zero position faster than if one drives at moderate speed. Since the hand is set via the cannon pinion, the adjustment is possible with particular precision.

Combining the device in accordance with the invention with a revolution indicator into a single combined instrument further contributes to decreasing the cost of the device of the invention since, in such case, separate wiring from the revolution indicator to the device of the invention is not required within the vehicle.

The need for maintenance work is indicated particularly clearly if the device of the invention contains a warning light (11) which is turned on when the hand (8) is in zero position.

The invention permits of numerous possible embodiments. In order to explain its basic principle, reference will be had below to the illustration of a preferred embodiment contained in the drawing, in which.

Figure 1:
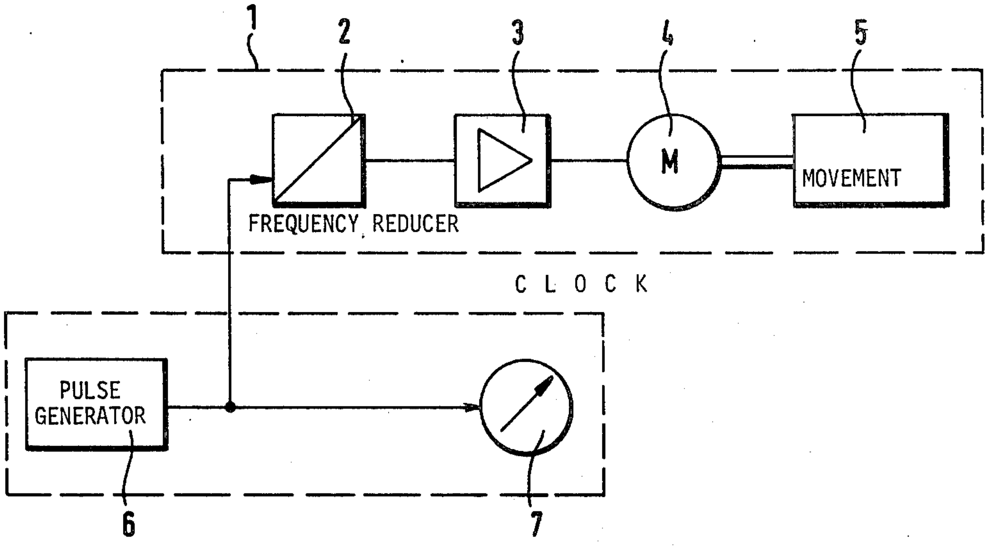
FIG. 1 is a block diagram of the device of the invention.

FIG. 1 shows, in the form of a dashed-line box, an ordinary electric clockwork 1 which, however, is lacking the quartz oscillator. As is customary, the clockwork 1 has a frequency reducer 2, and amplifier 3, a stepping motor (4) and a movement 5.

While normally, in an electric clockwork the frequency reducer receives electric pulses from a quartz oscilltor, in the present invention the reducer is acted upon by pulses from a pulse generator 6. This pulse generator 6 can, as shown, be the ordinary revolution transmitter of a revolution indicator 7 but it may also be a seprate part which is intended exclusively for the device of the invention. This latter is advisable for automotive vehicles in which no revolution indicator is provided.

Figure 2:
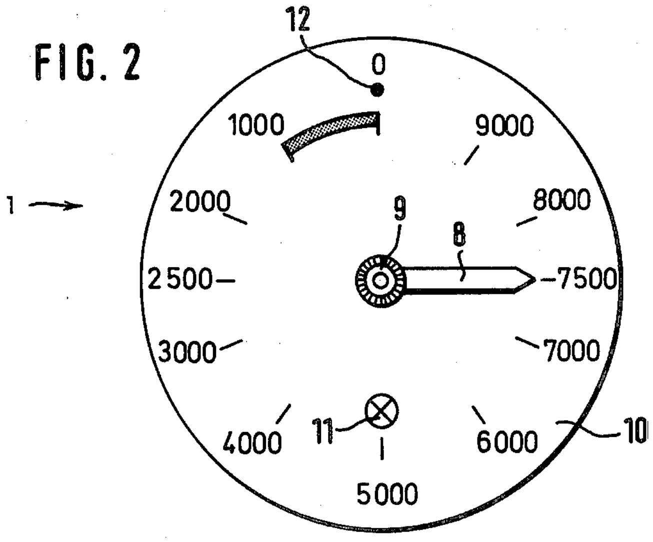
FIG. 2 is a front view of the device of the invention.

FIG. 2 shows the device of the invention in front view. It has only a single hand 8, which corresponds to the hour hand of an automobile clock. The hand 8 can be set by means of an ordinary setting device 9. For this purpose, the setting device engages into the cannon pinion (not shown) of the device.

The device furthermore has a scale 10 with kilometer markings which increase in counterclockwise direction. If the pointer 8 is, for instance, set at 7500 km after a change of oil, the hand travels in clockwise direction whenever the vehicle is driven until it reaches the zero position, thus indicating the need to change the oil. A warning light 11 can furthermore be provided in the device, it additionally indicating the need to change the oil when the zero position has been reached.

Finally, 12 is a stop pin whih is located in the dial 10.

I claim:

1. In a device for indicating the need for maintenance work on an internal combustion engine as a function of the condition of the internal combustion engine, the improvement comprising an electronic clock mechanism, the time-determining component of said clock mechanism being replaced by an electric pulse generator coupled to said engine, and wherein said generator gives off, per unit of time, a number of pulses in response to the condition of said engine, and wherein the number of pulses is in response to an operational parameter of said engine dependent on the engine load.

2. The device as set forth in claim 1, wherein the pulse generator operates in dependency on the operation of the internal combustion engine.

3. The device as set forth in claim 1, wherein the pulse generator operates in dependency on fuel consumption of said engine.

4. The device as set forth in claim 1, wherein the pulse generator operates in dependency on the speed of travel of a vehicle coupled to said engine.

5. The device as set forth in claim 1, further comprising an injection system of said engine, and wherein the pulse generator operates in dependency on pulses of said injection system of said engine.

6. The device as set forth in claim 1, wherein the clock mechanism corresponds to the mechanism of an ordinary clock without a second hand and a minute hand, and wherein the face of the clock mechanism is provided with a kilometer graduation.

7. The device as set forth in claim 1, wherein the clock mechanism has means comprising a setting device and a cannon pinion for setting a hand via said cannon pinion, the face of the clock mechanism having a scale graduated in kilometers which increases in counterclockwise direction.

8. The device as set forth in claim 1 or 7, wherein the maintenance work is a changing of oil, and a hand of the clock mechanism can be set to a specific kilometer reading after said changing of the oil.

9. The device as set forth in claim 8, further comprising warning light means operatively connected for being turned on when a hand of said clock mechanism is in zero position.

10. The device as set forth in claim 7 further comprising warning light means operatively connected for being turned on when a hand of said clock mechanism is in zero position.

11. In a device for indicating the need for maintenance work on an internal combustion engine as a function of a condition of the internal combustion engine, an electronic clock mechanism comprising a clock face having distance measurements thereon, a hand positioned for rotation about said clock face, movement means for driving said hand, a stepping motor for imparting mechanical motion to said movement means, a pulse generator means responsive to operating characteristics of said engine in the class of engine characteristics including fuel consumption, fuel injection and distance of travel by a vehicle driven by said engine, said generator means being responsive to such operating characteristics to provide electric pulses, the number of such pulses increasing with the amount of each characteristic, and means responsive to said pulses of said pulse generator means for pulsing said stepping motor to advance said hand along said clock face to indicate the need for maintenance.

* * * * *